US009480056B2

(12) United States Patent
Hammarwall et al.

(10) Patent No.: US 9,480,056 B2
(45) Date of Patent: *Oct. 25, 2016

(54) SYSTEM AND METHOD FOR ALLOCATING TRANSMISSION RESOURCES

(71) Applicant: TELEFONAKTIEBOLAGET L M ERICSSON (PUBL), Stockholm (SE)

(72) Inventors: David Hammarwall, Vallentuna (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/957,759

(22) Filed: Dec. 3, 2015

(65) Prior Publication Data

US 2016/0143019 A1     May 19, 2016

Related U.S. Application Data

(63) Continuation of application No. 14/250,528, filed on Apr. 11, 2014, now Pat. No. 9,237,565, which is a continuation of application No. 13/104,373, filed on May 10, 2011, now Pat. No. 8,705,574.

(60) Provisional application No. 61/332,867, filed on May 10, 2010.

(51) Int. Cl.
*H04J 4/00* (2006.01)
*H04W 72/04* (2009.01)
(Continued)

(52) U.S. Cl.
CPC ....... *H04W 72/0406* (2013.01); *H04B 7/0413* (2013.01); *H04L 1/003* (2013.01);
(Continued)

(58) Field of Classification Search
CPC ........... H04W 72/0413; H04W 72/04; H04W 72/0406; H04B 7/0413; H04B 7/04; H04B 7/0486; H04B 7/0669; H04L 5/0091; H04L 5/0053; H04L 5/00; H04L 1/003; H04L 1/0079; H04L 1/0071; H04L 1/1664; H04L 1/1671; H04L 25/03929
USPC .................................................. 370/478–480
See application file for complete search history.

(56) References Cited

U.S. PATENT DOCUMENTS 7,661,038 B2   2/2010   Li et al.
7,697,622 B2   4/2010   Han et al.
(Continued)

OTHER PUBLICATIONS

3GPP TS 36.212 V9.1.0; 3rd Generation Partnership Project; Technical Specification Group Radio Access Network; Evolved Universal Terrestrial Radio Access (E-UTRA); Multiplexing and channel coding (Release 9); Mar. 2010.
(Continued)

*Primary Examiner* — Peter Cheng

(57) ABSTRACT

Methods for wirelessly transmitting user data and control information using a plurality of transmission layers include encoding bits of control information to form control codewords and encoding bits of user data to form user data codewords. The method also includes generating a plurality of vector symbols based on the control codewords and the user data codewords. Each vector symbol includes a plurality of modulation symbols that are each associated with a transmission layer over which the associated modulation symbol will be transmitted. Generating the plurality of vector symbols includes interleaving bits of the control codewords and bits of the user data codewords so that the control information is carried in modulation symbols associated with the same transmission layers in the vector symbols transmitted during the subframe that carry the control information. The method also includes transmitting the plurality of vector symbols to a receiver over a plurality of transmission layers.

15 Claims, 13 Drawing Sheets

(51) Int. Cl.
*H04L 1/00* (2006.01)
*H04B 7/04* (2006.01)
*H04L 5/00* (2006.01)
*H04B 7/06* (2006.01)
*H04L 25/03* (2006.01)
*H04L 1/16* (2006.01)

(52) U.S. Cl.
CPC .......... *H04L 1/0079* (2013.01); *H04L 5/0053* (2013.01); *H04L 5/0091* (2013.01); *H04W 72/0413* (2013.01); *H04B 7/04* (2013.01); *H04B 7/0486* (2013.01); *H04B 7/0669* (2013.01); *H04L 1/0071* (2013.01); *H04L 1/1664* (2013.01); *H04L 1/1671* (2013.01); *H04L 5/00* (2013.01); *H04L 25/03929* (2013.01); *H04W 72/04* (2013.01)

(56) References Cited

U.S. PATENT DOCUMENTS

| | | | |
|---|---|---|---|
| 8,320,407 | B2 | 11/2012 | Palanki et al. |
| 8,331,464 | B2 | 12/2012 | Lee et al. |
| 8,625,554 | B2 | 1/2014 | Zhang et al. |
| 8,670,496 | B2 | 3/2014 | Nam et al. |
| 2007/0280373 | A1 | 12/2007 | Lee et al. |
| 2008/0086662 | A1 | 4/2008 | Li et al. |
| 2008/0240159 | A1 | 10/2008 | Palanki et al. |
| 2009/0073922 | A1 | 3/2009 | Malladi et al. |
| 2010/0195624 | A1* | 8/2010 | Zhang ................. H04B 7/0413 370/335 |
| 2010/0296603 | A1 | 11/2010 | Lee et al. |
| 2011/0255619 | A1 | 10/2011 | Nam et al. |

OTHER PUBLICATIONS

Samsung; 3GPP TSG RAN WG1 #60bis; Discussion on Data and Control Multiplexing in UL MIMO Transmissions; R1-102212; Beijing, China; Apr. 12-16, 2010.

Motorola; 3GPP TSG RAN1 #60bis; On Multiplexing Control and Data in Multi-layer UL-MIMO Transmissions; R1-102149; Beijing, China; Apr. 12-16, 2010.

Samsung; 3GPP TSG RAN WG1 #61; Further Discussion on Data and Control Multiplexing in UL MIMO Transmissions; R1-103037; Montreal, Canada; May 10-14, 2010.

Huawei; 3GPP TSG RAN WG1#61; Comparison of Multiplexing Schemes of Control and Data in Multi-layer PUSCH Transmission; R1-103111; Montreal, Canada; May 10-14, 2010.

3GPP TS 36.211 V9.1.0; 3rd Generation Partnership Project; Technical Specification Group Radio Access Network; Evolved Universal Terrestrial Radio Access (E-UTRA); Physical Channels and Modulation (Release 9); Mar. 2010.

LG Electronics: Multiplexing scheme with UCI and data on PUSCH. 3GPP TSG RAN WG1 60bis. R1-102387; Beijing, China. Apr. 12-16, 2010.

Texas Instruments: Data and Control Multiplexing for UL Multi-Antenna Transmission. 3GPP TSG RAN WG1 30bis. R1-102108; Beijing, China. Apr. 12-16, 2010.

* cited by examiner

FIRST LAYER OF VECTOR SYMBOLS

FIG. 8A-1

SECOND LAYER OF VECTOR SYMBOLS

FIG. 8A-2

INTERLEAVER OUTPUT

| $\tilde{q}_0$ | $\tilde{q}_2$ | $\tilde{q}_4$ | | $\tilde{q}_6$ | $\tilde{q}_8^{(0)}$ | $\tilde{q}_{10}$ | $\tilde{q}_{12}$ | $\tilde{q}_{14}$ | $\tilde{q}_{16}$ | | $\tilde{q}_{18}$ | $\tilde{q}_{20}$ | $\tilde{q}_{22}$ |
|---|---|---|---|---|---|---|---|---|---|---|---|---|---|
| $\tilde{q}_{24}$ | $\tilde{q}...$ | $\tilde{q}...$ | | $\tilde{q}...$ | $q_{2Q'-2}$ | $\tilde{f}_0^{(0)}$ | $\tilde{f}_2^{(0)}$ | $\tilde{f}_4^{(0)}$ | $\tilde{f}_6^{(0)}$ | | $\tilde{f}_...^{(0)}$ | $\tilde{f}_...^{(0)}$ | $\tilde{f}_...^{(0)}$ |
| ⋮ | | | | ⋮ | | | | ⋮ | | | ⋮ | | |
| $\tilde{f}_...^{(0)}$ | $\tilde{q}_4^{RI}$ | $\tilde{q}_4^{ACK}$ | | $\tilde{f}_...^{(0)}$ | $\tilde{f}_...^{(0)}$ | $\tilde{f}_...^{(0)}$ | $\tilde{f}_...^{(0)}$ | $\tilde{f}_...^{(0)}$ | $\tilde{f}_...^{(0)}$ | | $\tilde{q}_5^{ACK}$ | $\underline{q}_5^{RI}$ | $\tilde{f}_...^{(0)}$ |
| $\tilde{f}_...^{(0)}$ | $\tilde{q}_0^{RI}$ | $\tilde{q}_0^{ACK}$ | | $\tilde{q}_3^{ACK}$ | $\tilde{q}_3^{RI}$ | $\tilde{f}_...^{(0)}$ | $\tilde{f}_...^{(0)}$ | $\tilde{q}_2^{RI}$ | $\tilde{q}_2^{ACK}$ | | $\tilde{q}_1^{ACK}$ | $\underline{q}_1^{RI}$ | $\tilde{f}_...^{(0)}$ |

FIRST LAYER OF VECTOR SYMBOLS

| $\tilde{q}_1$ | $\tilde{q}_3$ | $\tilde{q}_5$ | | $\tilde{q}_7$ | $\tilde{q}_9$ | $\tilde{q}_{11}$ | $\tilde{q}_{13}$ | $\tilde{q}_{15}$ | $\tilde{q}_{17}$ | | $\tilde{q}_{19}$ | $\tilde{q}_{21}$ | $\tilde{q}_{23}$ |
|---|---|---|---|---|---|---|---|---|---|---|---|---|---|
| $\tilde{q}_{25}$ | $\tilde{q}...$ | $\tilde{q}...$ | | $\tilde{q}...$ | $q_{2Q'-1}$ | $\tilde{f}_1^{(0)}$ | $\tilde{f}_3^{(0)}$ | $\tilde{f}_5^{(0)}$ | $\tilde{f}_7^{(0)}$ | | $\tilde{f}_...^{(0)}$ | $\tilde{f}_...^{(0)}$ | $\tilde{f}_...^{(0)}$ |
| ⋮ | | | | ⋮ | | | | ⋮ | | | ⋮ | | |
| $\tilde{f}_...^{(0)}$ | $\tilde{q}_4^{RI}$ | $\tilde{q}_4^{ACK}$ | | $\tilde{f}_...^{(0)}$ | $\tilde{f}_...^{(0)}$ | $\tilde{f}_...^{(0)}$ | $\tilde{f}_...^{(0)}$ | $\tilde{f}_...^{(0)}$ | $\tilde{f}_...^{(0)}$ | | $\tilde{q}_5^{ACK}$ | $\tilde{q}_5^{RI}$ | $\tilde{f}_...^{(0)}$ |
| $\tilde{f}_...^{(0)}$ | $\tilde{q}_0^{RI}$ | $\tilde{q}_0^{ACK}$ | | $\tilde{q}_3^{ACK}$ | $\tilde{q}_3^{RI}$ | $\tilde{f}_...^{(0)}$ | $\tilde{f}_...^{(0)}$ | $\tilde{q}_2^{RI}$ | $\tilde{q}_2^{ACK}$ | | $\tilde{q}_1^{ACK}$ | $\tilde{q}_1^{RI}$ | $\tilde{f}_...^{(0)}$ |

SECOND LAYER OF VECTOR SYMBOLS

| $q_0$ | $q_2$ | $q_4$ | | $q_6$ | $q_8$ | $q_{10}$ | $q_{12}$ | $q_{14}$ | $q_{16}$ | | $q_{18}$ | $q_{20}$ | $q_{22}$ |
|---|---|---|---|---|---|---|---|---|---|---|---|---|---|
| $q_1$ | $q_3$ | $q_5$ | | $q_7$ | $q_9$ | $q_{11}$ | $q_{13}$ | $q_{15}$ | $q_{17}$ | | $q_{19}$ | $q_{21}$ | $q_{23}$ |
| $q_{24}$ | $q_{...}$ | $q_{...}$ | | $q_{...}$ | $q_{2Q'-2}$ | $f_0^{(0)}$ | $f_2^{(0)}$ | $f_4^{(0)}$ | $f_6^{(0)}$ | | $f_{...}^{(0)}$ | $f_{...}^{(0)}$ | $f_{...}^{(0)}$ |
| $q_{25}^{(0)}$ | $q_{...}^{(0)}$ | $q_{...}^{(0)}$ | | $q_{...}^{(0)}$ | $q_{2Q'-1}^{(0)}$ | $f_1^{(0)}$ | $f_3^{(0)}$ | $f_5^{(0)}$ | $f_7^{(0)}$ | | $f_{...}^{(0)}$ | $f_{...}^{(0)}$ | $f_{...}^{(0)}$ |
| ⋮ | | ⋮ | | | ⋮ | | | ⋮ | | | | ⋮ | |
| $f_{...}^{(0)}$ | $q_4^{RI}$ | $q_4^{ACK}$ | | $f_{...}^{(0)}$ | $f_{...}^{(0)}$ | $f_{...}^{(0)}$ | $f_{...}^{(0)}$ | $f_{...}^{(0)}$ | $f_{...}^{(0)}$ | | $q_5^{ACK}$ | $q_5^{RI}$ | $f_{...}^{(0)}$ |
| $f_{...}^{(0)}$ | $q_4^{RI}$ | $q_4^{ACK}$ | | $f_{...}^{(0)}$ | $f_{...}^{(0)}$ | $f_{...}^{(0)}$ | $f_{...}^{(0)}$ | $f_{...}^{(0)}$ | $f_{...}^{(0)}$ | | $q_5^{ACK}$ | $q_5^{RI}$ | $f_{...}^{(0)}$ |
| $f_{...}^{(0)}$ | $q_0^{RI}$ | $q_0^{ACK}$ | | $q_3^{ACK}$ | $q_3^{RI}$ | $f_{...}^{(0)}$ | $f_{...}^{(0)}$ | $q_2^{RI}$ | $q_2^{ACK}$ | | $q_1^{ACK}$ | $q_1^{RI}$ | $f_{...}^{(0)}$ |
| $f_{...}^{(0)}$ | $q_0^{RI}$ | $q_0^{ACK}$ | | $q_3^{ACK}$ | $q_3^{RI}$ | $f_{...}^{(0)}$ | $f_{...}^{(0)}$ | $q_2^{RI}$ | $q_2^{ACK}$ | | $q_1^{ACK}$ | $q_1^{RI}$ | $f_{...}^{(0)}$ |

EXTENDED INTERLEAVER OUTPUT

FIG. 8B-3

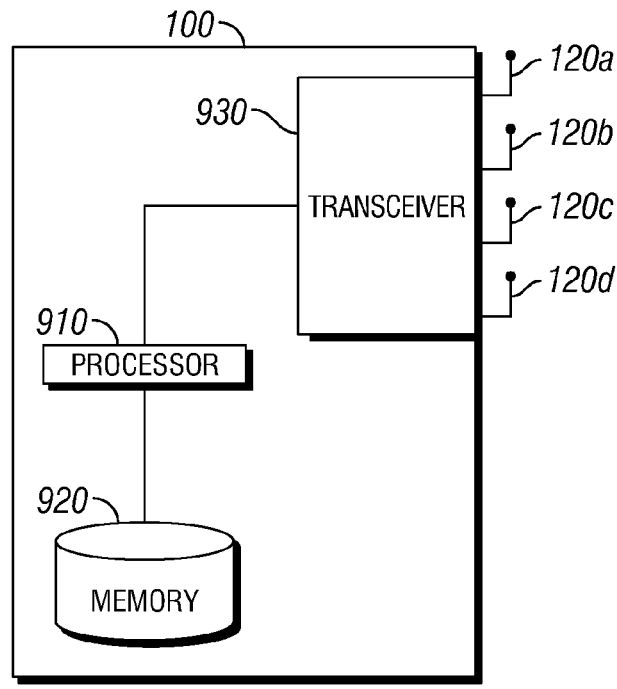

FIG. 9

SYSTEM AND METHOD FOR ALLOCATING TRANSMISSION RESOURCES

PRIORITY CLAIM UNDER 35 U.S.C. 119(e)

This Application is a continuation of U.S. patent application Ser. No. 14/250,528 filed on Apr. 11, 2014, which is a continuation of U.S. patent application Ser. No. 13/104,373, filed May 10, 2011, which claims the benefit of U.S. Provisional Patent Application No. 61/332,867, filed May 10, 2010. The respective disclosures of these applications are hereby incorporated by reference.

TECHNICAL FIELD OF THE INVENTION

This disclosure relates in general to wireless communication and, more particularly, to resource allocation for multi-antenna transmissions.

BACKGROUND OF THE INVENTION

Multi-antenna transmission techniques can significantly increase the data rates and reliability of wireless communication systems, especially in systems where the transmitter and the receiver are both equipped with multiple antennas to permit the use of multiple-input multiple-output (MIMO) transmission techniques. Advanced communication standards such as Long Term Evolution (LTE) Advanced utilize MIMO transmission techniques that may permit data to be transmitted over multiple different spatially-multiplexed channels simultaneously, thereby significantly increasing data throughput.

While MIMO transmission techniques can significantly increase throughput, such techniques can greatly increase the complexity of managing radio channels. Additionally, many advanced communication technologies, such as LTE, rely on a substantial amount of control signaling to optimize the configuration of transmitting devices and their use of the shared radio channel. Because of the increased amount of control signaling in advanced communication technologies, it is often necessary for user data and control signaling to share transmission resources. For example, in LTE systems, control signaling and user data are, in certain situations, multiplexed by user equipment ("UE") for transmission over a physical uplink shared channel ("PUSCH").

However, conventional solutions for allocating transmission resources are designed for use with single layer transmission schemes in which only a single codeword of user data is transmitted at a time. As a result, such resource allocation solutions fail to provide optimal allocation of transmission resources between control information and user data when MIMO techniques are being utilized to transmit data on multiple layers simultaneously.

SUMMARY OF THE INVENTION

In accordance with the present disclosure, certain disadvantages and problems associated with wireless communication have been substantially reduced or eliminated. In particular, certain devices and techniques for allocating transmission resources between control information and user data are described.

In accordance with one embodiment of the present disclosure, a method for wirelessly transmitting user data and at least a first type of control information using a plurality of transmission layers including encoding bits of a first type of control information to form one or more control codewords and encoding bits of user data to form one or more user data codewords. The method also includes generating a plurality of vector symbols based on the control codewords and the user data codewords. Each vector symbol includes a plurality of modulation symbols that are each associated with a transmission layer over which the associated modulation symbol will be transmitted. Generating the plurality of vector symbols includes interleaving bits of the one or more control codewords and bits of the one or more user data codewords so that the first type of control information is carried in modulation symbols associated with the same transmission layers in all the vector symbols transmitted during the subframe that carry the first type of control information. The method also includes transmitting the plurality of vector symbols to a receiver over a plurality of transmission layers.

Additional embodiments include apparatuses capable of implementing the above method and/or variations thereof.

Important technical advantages of certain embodiments of the present invention include increasing the benefits gained from transmission diversity and simplifying processing of multi-antenna transmissions. Particular embodiments enable control information and user data to be divided into separate vector symbols so that control and data are time multiplexed, as opposed to being transmitted in parallel. In particular embodiments, this separation may be attained without incurring significant additional control overhead and may enable reuse of conventional uplink processing modules. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 8A-1 illustrates a matrix showing a mapping of control information and user data on a first layer of the resulting vector symbols.

FIG. 8A-2 illustrates a matrix showing the mapping of control information and user data on a second layer of the resulting vector symbols.

FIG. 8A-3 illustrates the channel interleaver output for the first channel.

FIG. 8B-1 illustrates a matrix showing the mapping of control information and user data on a first layer of the resulting vector symbols.

FIG. 8B-2 illustrates a matrix showing the mapping of control information and user data on a second layer of the resulting vector symbols.

FIG. 8B-3 illustrates the extended channel interleaver output.

FIG. 9 is a structural block diagram showing the contents of an example embodiment of the transmitter.

DETAILED DESCRIPTION OF THE INVENTION

Figure 1:
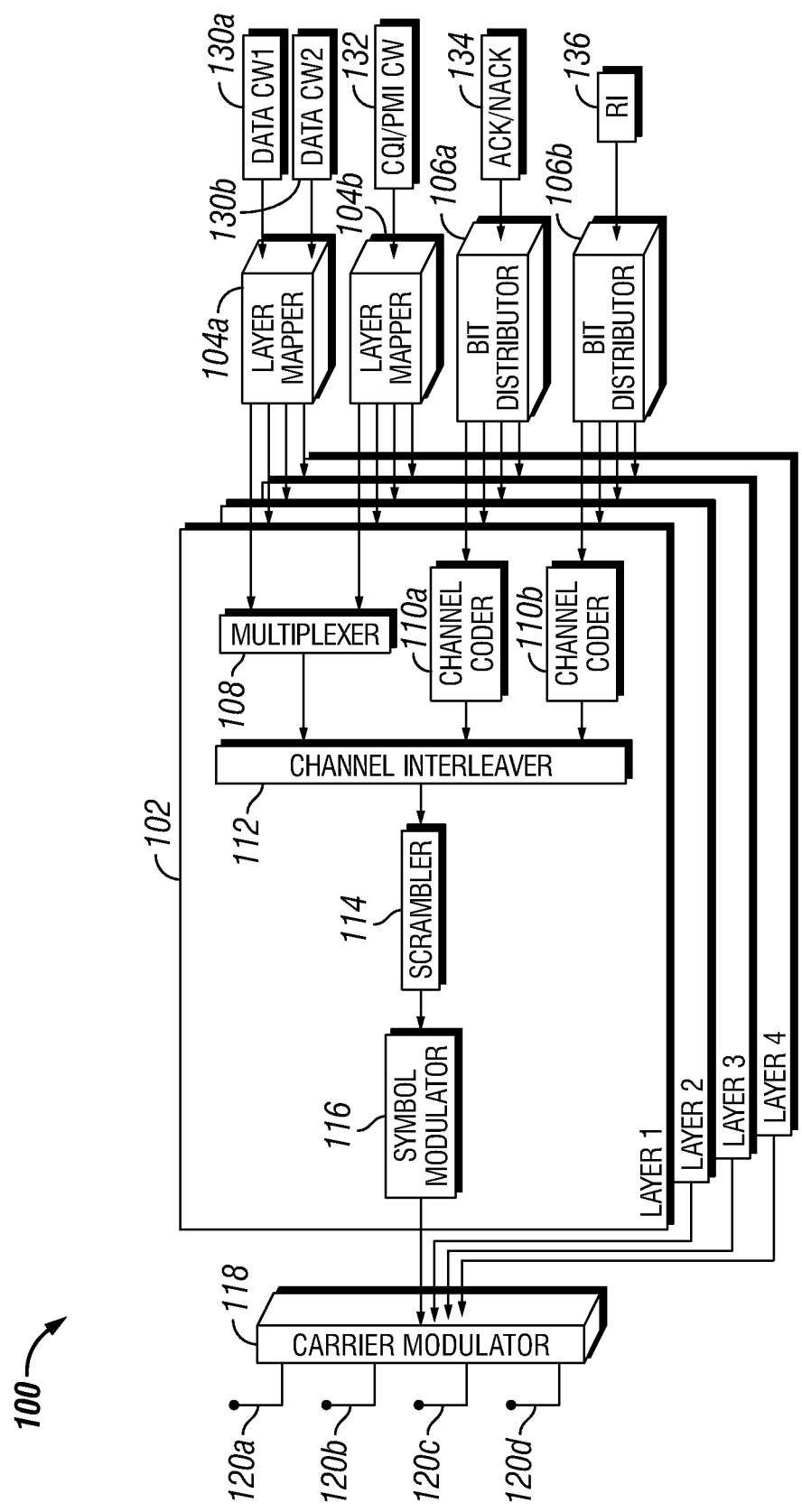
FIG. 1 is a functional block diagram illustrating a particular embodiment of a multi-antenna transmitter.

FIG. 1 is a functional block diagram illustrating a particular embodiment of a multi-antenna transmitter 100. In particular, FIG. 1 shows a transmitter 100 configured to multiplex certain control signaling with user data for transmission over a single radio channel. By intelligently implementing the coding, interleaving, layer mapping, and other aspects of the transmission, transmitter 100 may be able to improve upon the resulting allocation of user data and control signaling to transmission resources, as described further below.

Control signaling can have a critical impact on the performance of wireless communication systems. As used herein, "control signaling" and "control information" refers to any information communicated between components for purposes of establishing communication, any parameters to be used by one or both of the components in communicating with one another (e.g., parameters relating to modulation, encoding schemes, antenna configurations), any information indicating receipt or non-receipt of transmissions, and/or any other form of control information. In LTE systems, control signaling in the uplink direction includes, for example, Hybrid Automatic Repeat reQuest (HARQ) Acknowledgments/Negative Acknowledgements (ACK/NAKs), precoder matrix indicators (PMIs), rank indicators (RIs), and channel quality indicators (CQIs), which are all used by the eNodeB to get confirmation of successful reception of transport blocks or to improve the performance of downlink transmissions.

Although control signaling is often transmitted on separate control channels, such as the physical uplink control channel (PUCCH) in LTE, under certain circumstances it may be beneficial or necessary to transmit control signaling on the same channel as other data. For example, in LTE systems, when a periodic PUCCH allocation coincides with a scheduling grant for a user equipment (UE) to transmit user data, the user data and control signaling share transmission resources to preserve the single-carrier property of the discrete Fourier transform, spread orthogonal frequency-division multiplexing (DFTS-OFDM) transmission techniques used by LTE UEs. Furthermore, when a UE receives a scheduling grant to transmit data on the physical uplink shared channel (PUSCH), it typically receives information from the eNodeB related to the characteristics of the uplink radio propagation channel and other parameters that can be used to improve the efficiency of PUSCH transmissions. Such information may include modulation and coding scheme (MCS) indicators as well as, for UEs capable of using multiple transmission antennas, PMIs or RIs. As a result, UEs may be able to use this information to optimize PUSCH transmissions for the radio channel, thereby increasing the amount of data that can be transmitted for a given set of transmission resources. Thus, by multiplexing control signaling with the user data transmitted on PUSCH, a UE can support significantly larger control payloads than when transmitting control signaling by itself on PUCCH.

In such circumstances, it may be possible for transmitter 100 to multiplex control signaling and user data in the same manner as is proposed by Release 8 of the LTE standard. Under such a scheme, some or all control signals are distributed onto multiple codewords (e.g., by repetition or by a serial-to-parallel conversion) and each codeword is then processed individually. After symbol modulation, the two sequences of modulated symbols are mapped onto their assigned layers to form a sequence of vector symbols. As used herein, a "vector symbol" may represent any collection of information that includes an information element associated with each transmission layer over which the information is to be transmitted. The vector symbols are then modulated onto appropriate carriers and transmitted.

However, using this technique to allocate transmission resources (e.g., vector symbols) to particular elements of user data or control information, can make it difficult to separate control information from user data so that the two types of information are mapped onto separate vector symbols. Separation of this sort may be desirable for certain types of control information. The difficulty in doing this is primarily due to the interleavers used by most conventional devices to map modulation symbols into a subframe resource grid, such as the example grid shown in FIG. 3. In Release 8 LTE user equipment (UE), the interleaver maps modulation symbols of concatenated CQI/PMI and data codewords into the subframe resource grid in a row first, and column next order. However, the carrier modulator for such UEs reads DFTS-OFDM symbols out of the interleaver in a column first fashion, making it difficult to determine what the resulting allocation of control and user data will be.

Furthermore, if a particular user data codeword is mapped to, e.g., two layers, then the part of the control codeword to be multiplexed with the data codeword must cover a multiple of two entire rows in the resource grid. Otherwise, there will be columns in the grids that have an odd number of modulation symbols carrying control information, in which case user data and control will be mixed in a single vector symbol. This can cause significantly more overhead to be used for transmissions of control information since LTE Release 8 permits a control codeword to use any fraction of a row in the transmission resource grid to reduce overhead. Reconfiguring the Release 8 scheme to remove the above constraint on control resource allocation would involve significant redesign of either the channel interleaver or the multiplexing unit specified by Release 8. Additionally, it would create significant inter-dependencies between the layer mapping and the components responsible for processing the user data and control information. Such interdependencies can result in complex implementations and may significantly complicate backwards compatibility.

As a result, certain embodiments of transmitter 100 may be configured to allocate a given type of control information to the same, specific elements of the vector symbols that carry that type of control information. For example, a particular type of control information may be allocated to the elements associated with the first layer and second layer in all the vector symbols that carry that type of control information. Thus, in such embodiments, a given type of control information may be mapped to the same layers in all vector symbols that are used to transmit the relevant control information. Furthermore, particular embodiments of transmitter 100 isolate all or some (e.g., certain types) of the control signaling transmitted during a particular subframe on separate vector symbols, with the relevant control information being transmitted on vector symbols that do not carry any user data. As a result, the relevant control signaling will be time multiplexed with the user data transmitted during the same subframe, instead of being transmitted in parallel with that user data.

Maintaining a consistent mapping of control information to the various layers across all the vector symbols carrying the control information may provide numerous advantages depending on the configuration of transmitter 100. In particular embodiments, maintaining a consistent mapping may increase the diversity benefits provided by the multiple transmission layers, as a given portion of the transmitted control information is more likely to be transmitted on multiple layers simultaneously than with conventional techniques for allocating transmission resources. Moreover, for particular embodiments of transmitter 100, the modulation and encoding schemes for the various layers are designed to ensure that the mapping pattern for the relevant types of control information is the same on all layers used to transmit that control information. This guarantees that a given portion of the control information will be transmitted simultaneously on all layers over which it is to be transmitted. Additionally, by isolating at least a portion of the control information on separate vector symbols, transmitter 100 may simplify processing on the receiving end, as the receiver may be able to perform identical processing on the control information received on every layer. As a result, certain embodiments of transmitter 100 may provide numerous operational benefits. Specific embodiments, however, may provide some, none, or all of these benefits.

As described further below, the various embodiments of transmitter 100 may implement the described allocation techniques using any of numerous different structural and/or functional configurations. FIG. 1 illustrates a particular embodiment of transmitter 100 configured to perform the described allocation techniques on a "per-layer" basis. In particular embodiments, as shown in FIG. 1, particular embodiments of transmitter 100 may include one or more layer mappers 104 and one or more bit distributors 106 capable of splitting (by replication and/or by segmentation) the user data and control information to be transmitted onto separate datapaths 102, with each datapath 102 being associated with a particular one of the transmission layers to be used for the transmission. By performing the codeword-to-layer mapping in the bit-level domain prior to control and data multiplexing, certain embodiments of transmitter 100 configured for per-layer processing may offer the additional benefit of permitting reuse of single stream components responsible for the modulation, scrambling, interleaving, encoding, or other processing in single-antenna transmitters.

Additionally, in particular embodiments, such as the one illustrated in FIG. 1, transmitter 100 may isolate certain types of control information onto separate vector symbols but permit other types of control information to be transmitted on vector symbols that are also carrying user data on other layers. Different types of control information may have different robustness requirements, may utilize different encoding schemes, or may be treated differently during transmission for various other reasons. Consequently, it may be more beneficial to isolate certain types of control information on separate vector symbols than it is to isolate other types of control information. For example, in LTE, Hybrid Automatic Repeat reQuest (HARQ) Acknowledgments/Negative Acknowledgements (ACK/NAKs) and rank indications (RIs) are typically only a few bits in length, and their successful transmission may be critical to system operation. As a result, HARQ ACK/NAKs and RIs may have different encoding requirements and may require special timing within a subframe (e.g., being transmitted near a reference signal in resource grid 400). By contrast, control information such as precoder matrix indications (PMIs) and channel quality indications (CQIs) may be of lesser importance and transmitter 100 may spread these types of control information throughout the subframe.

Thus, in the example embodiment illustrated by FIG. 1, transmitter 100 implements different processing for different types of control information. For example, in the illustrated example, a first type or types of control information (represented here by ACK/NAK bits 134 and RI bits 136) are input into separate bit distributors to be distributed to the various layers and encoded before being combined with any user data codewords 130 by interleaver 112. Particular embodiments transmitter 100 are configured to ensure that this first type of control information is ultimately allocated to vector symbols 140 that are not also carrying user data. By contrast, a second type or type(s) of control information (represented here by a CQI codeword 132 containing encoded CQI and/or PMI information) is concatenated, in the embodiment of FIG. 1, with one or more user data codewords 130 by a multiplexer 108 before being interleaved with the other types of control information (here, ACK/NAK bits 134 and RI bits 136). The second type(s) of control information may end up being transmitted in vector symbols 140 that also carry user data.

The embodiment of transmitter 100 illustrated by FIG. 1 includes one or more layer mappers 104 and one or more bit distributors 106 that associate their inputs with one or more of the various layers for processing. More specifically, layer mappers 104 receive user data codewords 130 (in this example, a user data codeword 130a and a user data codeword 130b) and CQI codewords 132 and map bits of these codewords to one of the transmission layers to be used by transmitter 100 for the relevant transmission. Bit distributor 106a receives unencoded ACK/NAK bits 134 and replicates the ACK/NAK bits 134 on each of the layers on which control information will be transmitted. In the illustrated example this involves replicating ACK/NAK on all of the layers that will be used for the transmission. Bit distributor 106b receives unencoded RI bits 136 and replicates the RI bits 136 on each of the layers on which control information will be transmitted. As with the ACK/NAK bits 134, this may involve replicating RI bits 136 on all of the layers that will be used to transmit control information.

Because the illustrated embodiment of transmitter 100 in FIG. 1 implements a per-layer processing scheme, each transmission layer available to transmitter 100 is associated with a separate datapath 102 comprising various elements responsible for processing the user data and control information that will be transmitted over the associated transmission layer. As a result, bit distributors 106a and 106b replicate their input bits for every datapath 102 over which the first type(s) of control information will be transmitted. A channel encoder 110a and a channel encoder 110b in each datapath 102 then encode the control information output by bit distributors 106a and b, respectively. The encoding performed by the various channel encoders 110 in transmitter 100 may be the same for all of the channel encoders 110 or may differ based on, for example, the transmission layer involved or the type of control information being encoded. Channel encoders 110a and 110b in each datapath 102 then output a control codeword to an interleaver 112 associated with the same layer as the relevant channel encoders 110.

Meanwhile, layer mapper 104*a* outputs one or more bits of user data codeword 130*a* or user data codeword 130*b* to each of the datapaths 102 associated with a layer over which the relevant user data codeword 130 will be transmitted. Similarly, layer mapper 104*b* outputs one or more bits of a control codeword of a second type of control information (here, CQIs and/or PMIs) to each of the datapaths 102 associated with a layer over which this second type of control information will be transmitted.

In particular embodiments, transmitter 100 may map the second type of control information to the various layers in a manner designed to facilitate the efficient allocation of user data and control information to transmission resources. As one example, in particular embodiments, transmitter 100 encodes the second type of control information prior to its layers. This encoding may be performed with a rate matching such that the length of the resulting control codeword is an even multiple of $$Q' \text{ of } \sum_{l=1}^{r} Q_{m,l},$$

where $Q_{m,l}$ is the number of bits of each modulation symbol on layer l, and r is the total number of layers that will be used to transmit the user data codeword 130 with which this control codeword will be multiplexed. Thus, the number of bits in the resulting control codeword will be equal to $$Q' \cdot \sum_{l=1}^{r} Q_{m,l}$$

As another example, transmitter 100 may map a number of bits equal to $Q' \cdot Q_{m,l}$ to each of the l layers over which this control codeword (and its multiplexed user data codeword 130) will be transmitted. Additionally, transmitter 100 may, as part of this mapping layers, segment the control codeword into r parts, where r is the number of layers used to transmit this control codeword and where the part assigned to layer l has the length $Q' \cdot Q_{m,l}$ bits.

As another example of the mapping that transmitter 100 may use for the second type of control information, transmitter 100 may perform a serial-to-parallel operation of the coded symbols in the control codeword such that, $$CW_l(k) = CW\left(\left\lfloor \frac{k}{Q_{m,l}} \right\rfloor \cdot \sum_{\substack{\bar{l}=1 \\ \bar{l} \neq l}}^{r} Q_{m,\bar{l}} + \sum_{\bar{l}=1}^{l-1} Q_{m,\bar{l}} + k\right),$$

where $CW_l(k)$ denotes the k-th bit (counting from 0) of this control codeword mapped to layer l (counting from 1) and CW(m) denotes the m-th bit (counting from 0) of the control codeword prior to bit-level layer mapping. A benefit of this option is that it guarantees that the same number of modulated symbols is required for the second type of control information on all layers, which may permit a design where control information and user data are fully mapped to separate vectors symbols.

Similarly, transmitter 100 may also perform the codeword-to-layer mapping of the user data codewords 130*a-b* in a manner designed to improve the subsequent allocation of user data and control information to transmission resources. As one example, transmitter 100 may perform the codeword-to-layer mapping of user data codewords 130*a-b* using a serial-to-parallel (S/P) operation such that in each pair of neighboring bits, the first bit is assigned to one layer and the rest is assigned to the other layer. This option has the benefit that it is simple to implement and that it does not introduce any additional delays. As another example, the bit-level codeword-to-layer mapping of the data may include a code-block segmentation operation such that the first half of the codeword is assigned to one layer and the second half to the other layer. This option has the benefit that it enables advanced per layer successive per-layer interference cancellation at the receiver, since it is likely that there will be entire block segments (including a cyclic redundancy check (CRC)) assigned fully to a single layer.

Once user data codewords 130 and CQI codewords 132 have been mapped to various layers to be used by transmitter 100 for the transmission, a multiplexer 108 in each datapath 102 then multiplexes the bits of user data codewords 130*a-b* and the bits of the CQI codeword 132 output to the relevant datapath 102, resulting in the CQI codeword 132 being concatenated with the user data codewords 130 on one or more layers. The output of each multiplexer 108 is then received by an interleaver 112 in the same datapath 102.

Each interleaver 112 then allocates encoded bits of user data and control information to transmission resources on the layer associated with that interleaver 112. Each interleaver 112 may map user data and control information to a resource grid such as the example resource grid illustrated by FIG. 3. Interleavers 112 associated with the various datapaths 102 in transmitter 100 may perform this interleaving in any suitable manner. In the embodiment shown by FIG. 1, transmitter 100 uses a per-layer processing scheme to transmit user data and control information. As a result, the illustrated embodiment may use conventional interleaving techniques on each layer, including interleaving techniques that might also be used in single antenna transmissions.

For example, particular embodiments of transmitter 100 may implement the channel interleaving specified by LTE Release 8 for each layer. LTE Release 8 interleaving utilizes a matrix of coded symbols (groups of $Q_m$ bits, where $Q_m$ is the number of bits forming a modulation symbol). Each column in this matrix corresponds to a DFTS-OFDM symbol. Under LTE Release 8 interleaving, the coded symbols (groups of $Q_m$ bits) of the RI codeword are inserted in the assigned positions (as indicated in the example resource grid of FIG. 3). Next, the concatenated CQI/user data codewords (resulting from the multiplexing of CQI codewords 132 and user data codewords 130) are inserted around the RI codeword in a row-first order. Then, coded symbols of HARQ codeword (groups of $Q_m$ bits) on a particular layer are inserted in the assigned positions shown in FIG. 3, puncturing the user data and potentially the CQI information.

Additionally, as explained above, the interleavers 112 for the various layers used by transmitter 100 may allocate user data and control information in such a manner that some or all of the control information may be allocated to separate vector symbols 140 that do not carry any user data. Because the illustrated embodiment in FIG. 1 uses a per-layer technique for processing user data and control information to be transmitted, the various interleavers 112 in the transmitter of FIG. 1 may achieve this separation in part by performing similar or identical interleaving on each of the layers used for a transmission. Furthermore, particular embodiments of transmitter 100 may also utilize the same modulation scheme on all layers for a given type of data, resulting in an identical mapping of control information and user data to transmission resources on every layer.

Once interleaving has been performed, the output of the channel interleaver on each layer is read out of the interleaving matrix a column at a time. These interleaved outputs are then scrambled by scramblers 114 in each datapath 102 and subsequently modulated by symbol modulators 116. In particular embodiments, the scrambling sequences performed by the respective scramblers 114 on each of the layers is initialized using a different seed. For example, scramblers 114 may scramble the output of the interleaver on their respective layer by perform the scrambling operation defined in §5.3.1 of 3GPP TS 36.211 V9.1.0, "E-UTRA, Physical Channels and Modulation" (which is herein incorporated by reference in its entirety) but with a layer-specific scrambling sequence, such as a layer-specific generator seed $c_{init} = c_{init}(q)$ for a layer q. Furthermore, in particular embodiments, scramblers 114 use a layer-specific scrambling sequence seed $c_{init}$ defined by the following equation:

$$c_{init} = n_{RNTI} \cdot 2^{15} + q \cdot 2^{13} + \lfloor n_s/2 \rfloor \cdot 2^9 + N_{ID}^{cell}.$$

where q is the layer associated with the sequence seed, $n_{RNTI}$ is a radio network temporary identifier for transmitter 100, $n_s$ is a slot number within a radio frame, and $N_{ID}^{cell}$ is a cell identifier associated with a cell in which vector symbols 140 are to be transmitted.

After symbol modulators 116 for each of the layers generate modulation symbols from the output of their corresponding scramblers 114, a set of modulation symbols from each of the datapaths 102 are collectively input into carrier modulator 118 as one or more vector symbols 140. Carrier modulator 118 modulates information from vector symbols 140 onto a plurality of radiofrequency (RF) sub-carrier signals. Depending on the communication technologies supported by transmitter 100, carrier modulator 118 may also process the vector symbols 140 to prepare them for transmission, such as by precoding vector symbols 140. The operation of an example embodiment of carrier modulator 118 for LTE implementations is described in greater detail below with respect to FIG. 2. After any appropriate processing, carrier modulator 118 then transmits the modulated subcarriers over a plurality of transmission antennas 120.

As explained above, if each of the channel interleavers 112 in the various datapaths 102 are configured to interleave input bits in the same manner (e.g., reading in bits in a row-by-column manner and reading out bits in a column-by-row manner), control information of the first type(s) will be output an vector symbols 140 that contain only that type of control information and do not include any user data. For the illustrated example, this means that bits from ACK/NAK codewords and RI codewords are carried by vector symbols 140 that do not contain any user data. By contrast, control information of the second type(s) will be mixed with user data in the vector symbols 140 output to carrier modulator 118. For the illustrated example, this means that bits from CQI codewords 132 are carried by vector symbols 140 that may also carry bits of user data on other layers.

Thus, by interleaving control information and user data such that vector symbols 140 carrying certain types of control information do not include any other type of data, transmitter 100 may improve transmit diversity gains achieved by the multi-antenna transmissions made by transmitter 100. Transmitter 100 may also reduce computational complexity in the processing performed both by transmitter 100 itself or by devices that receive the information transmitted by transmitter 100. Additionally, although the description herein focuses on implementation of the described resource allocation techniques in wireless communication networks supporting LTE, the described resource allocation techniques may be utilized in conjunction with any appropriate communication technologies including, but not limited to LTE, High-Speed Packet Access plus (HSPA+), and Worldwide Interoperability for Microwave Access (WiMAX).

Figure 2:
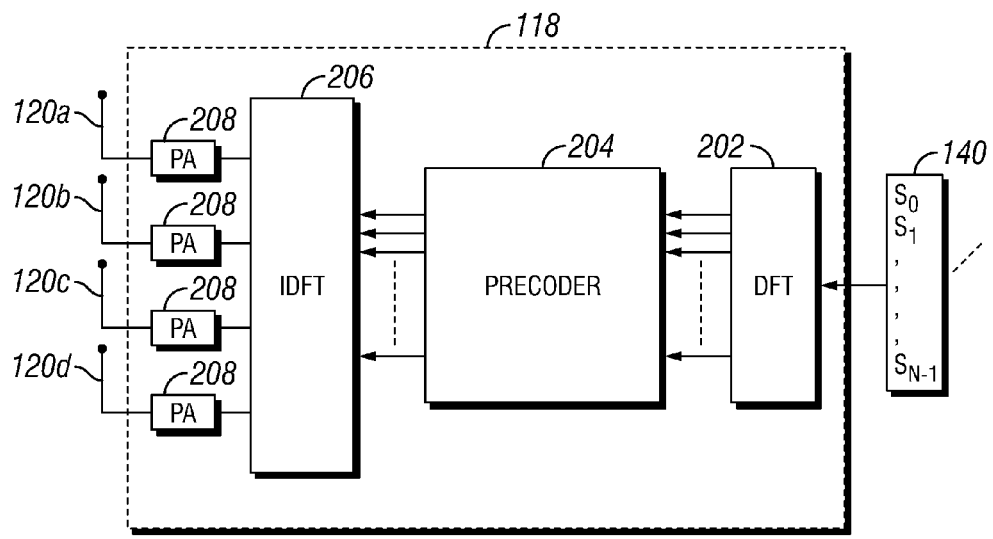
FIG. 2 is a functional block diagram illustrating a particular embodiment of a carrier modulator that may be used in the transmitter of FIG. 1.

FIG. 2 is a functional block diagram showing in greater detail the operation of a particular embodiment of carrier modulator 118. In particular, FIG. 2 illustrates an embodiment of carrier modulator 118 that might be used by an embodiment of transmitter 100 that utilizes DFTS-OFDM as required for uplink transmissions in LTE. Alternative embodiments may be configured to support any other appropriate type of carrier modulation. The illustrated embodiment of carrier modulator 118 includes a DFT 202, a precoder 204, an inverse DFT (IDFT) 206, and a plurality of power amplifiers (PAs) 208.

Carrier modulator 118 receives vector symbols 140 output by layer mapper 110. As received by carrier modulator 118, vector symbols 140 represent time domain quantities. DFT 202 maps vector symbols 140 to the frequency domain. The frequency-domain version of vector symbols 140 are then linearly precoded by precoder 204 using a precoding matrix, W, that is ($N_T \times r$) in size, where $N_T$ represents the number of transmission antennas 120 to be used by transmitter 100 and r represents the number of transmission layers that will be used by transmitter 100. This precoder matrix combines and maps the r information streams onto $N_T$ precoded streams. Precoder 204 then generates a set of frequency-domain transmission vectors by mapping these precoded frequency-domain symbols onto a set of sub-carriers that have been allocated to the transmission.

The frequency-domain transmission vectors are then converted back to the time domain by IDFT 206. In particular embodiments, IDFT 206 also applies a cyclic prefix (CP) to the resulting time-domain transmission vectors. The time-domain transmission vectors are then amplified by power amplifiers 208 and output from carrier modulator 118 to antennas 120, which are used by transmitter 100 to transmit the time-domain transmission vectors over a radio channel to a receiver.

As explained above, the described allocation techniques can be implemented in a variety of different ways by different embodiments of transmitter 100. FIGS. 4A-8B illustrate in greater detail the functionality of various embodiments of transmitter 100 that are capable of implementing the described allocation techniques.

Figure 4A:
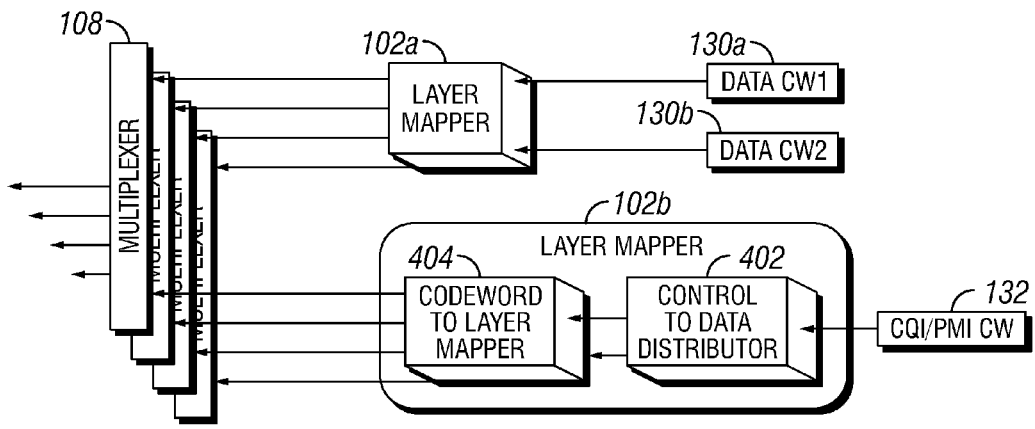
FIGS. 4A-4C provide further details on specific portions a particular embodiment of the transmitter.

FIGS. 4A-4C and 5A-5C illustrate one variation on a particular portion of transmitter 100. Specifically, FIG. 4A shows an embodiment of transmitter 100 that includes an expanded view of layer mapper 104b responsible for mapping codewords of the second type of control information (again, CQI codewords 132 for purposes of the example in FIG. 1) to the various transmission layers. In this expanded view, layer mapper 104b includes a control-to-data distributor 402 and a codeword-to-layer mapper 404. In the illustrated embodiment, the codeword-to-layer mapper 404 is identical to the layer mapper 104a for user data codewords 130. In this embodiment of transmitter 100, control-to-data distributor 402 distributes bits of CQI codewords 132 onto a number of sets of bits, each set associated with a user data codeword 130 (although some of these sets may be empty). Codeword-to-layer mapper 404 then maps the various portions of the CQI codeword 132 to different transmission layers based on the user data codeword 130 that the relevant portion of the CQI codeword 132 has been assigned to.

Figure 4C:
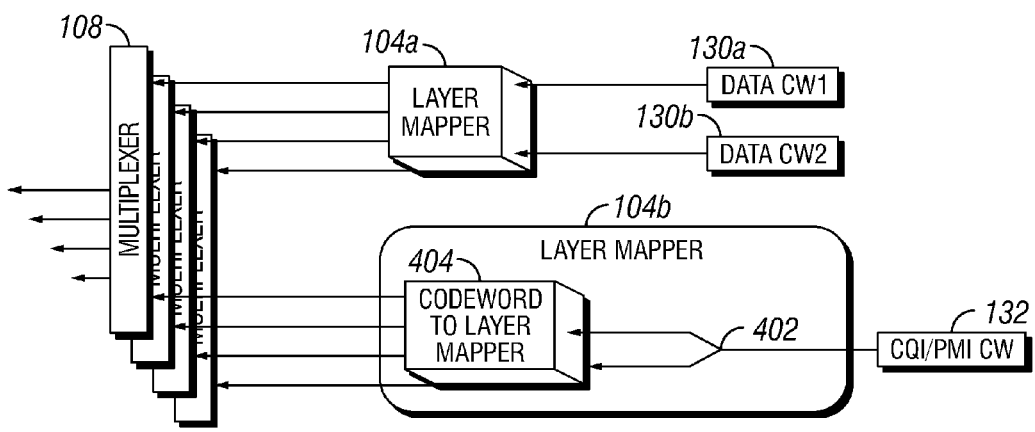
Figure 4B:
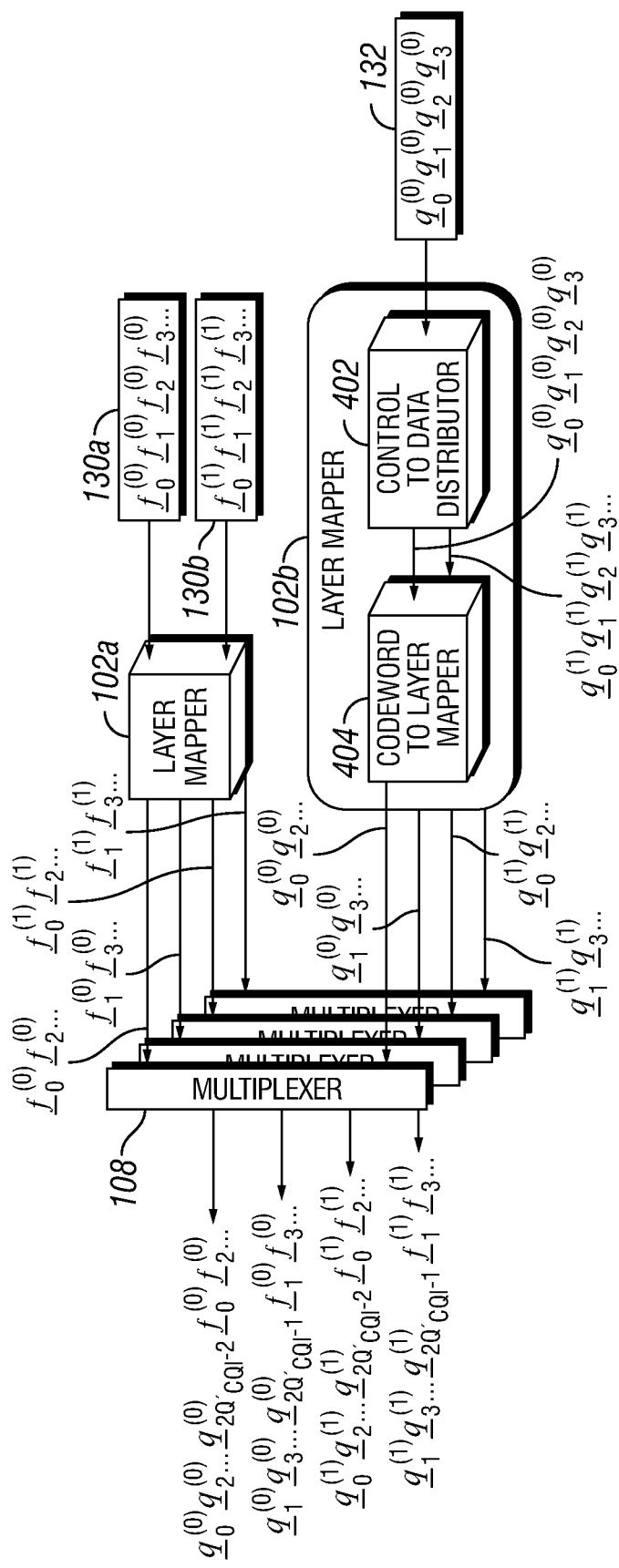

FIG. 4B shows example operation for a particular portion of transmitter 100 that is configured as shown by FIG. 4A. In the illustrated example, codeword-to-layer mapper 104 receives two user data codewords 130*a-b* and control-to-data distributor 402 distributes a single CQI codeword 132 between the two user data codewords 130*a-b*. Layer mapper 104*a* and codeword-to-layer mapper 404 then map user data codewords 130*a-b* and the distributed CQI codeword 132, respectively, to associated transmission layers, as shown by FIG. 4B.

FIG. 4C illustrates a related embodiment of transmitter 100 in which control-to-data distributor 402 utilizes a specific distribution function. In particular, FIG. 4C illustrates an embodiment in which control-codeword-to-data-codeword distributor 402 maps the relevant CQI codeword 132 to only one of the two user data codewords 130 to be transmitted.

Figure 5A:
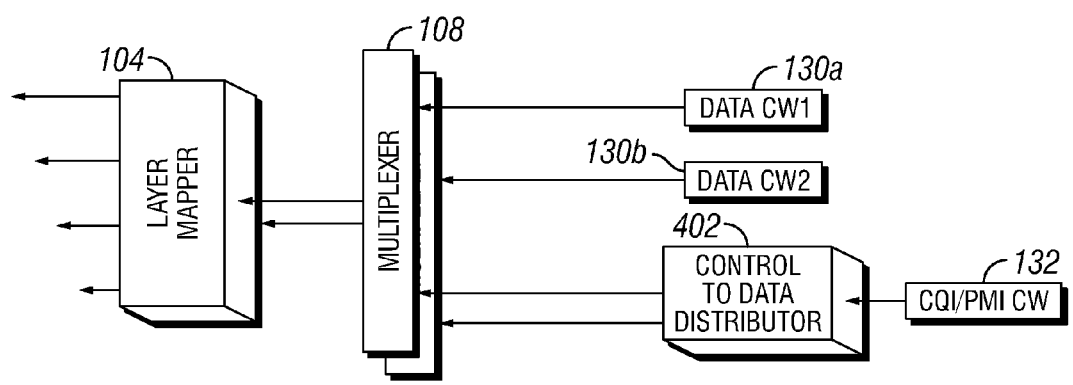
FIGS. 5A-5C also provide further details on specific portions a particular embodiment of the transmitter.
Figure 5C:
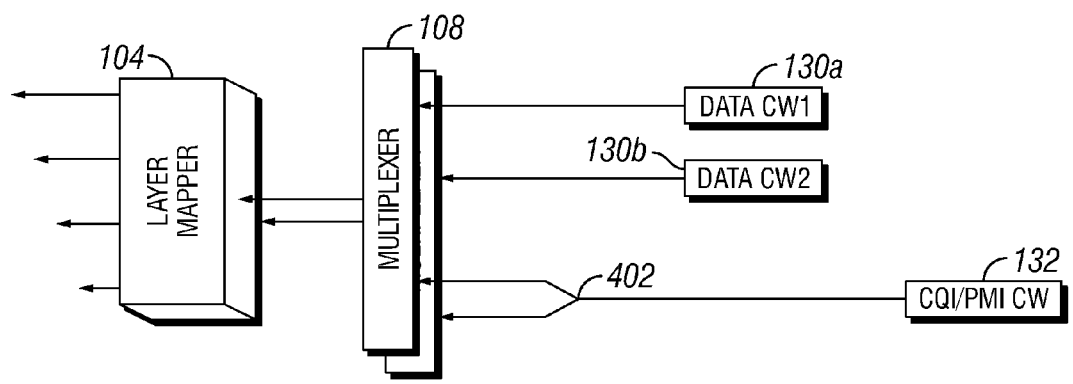
Figure 5B:
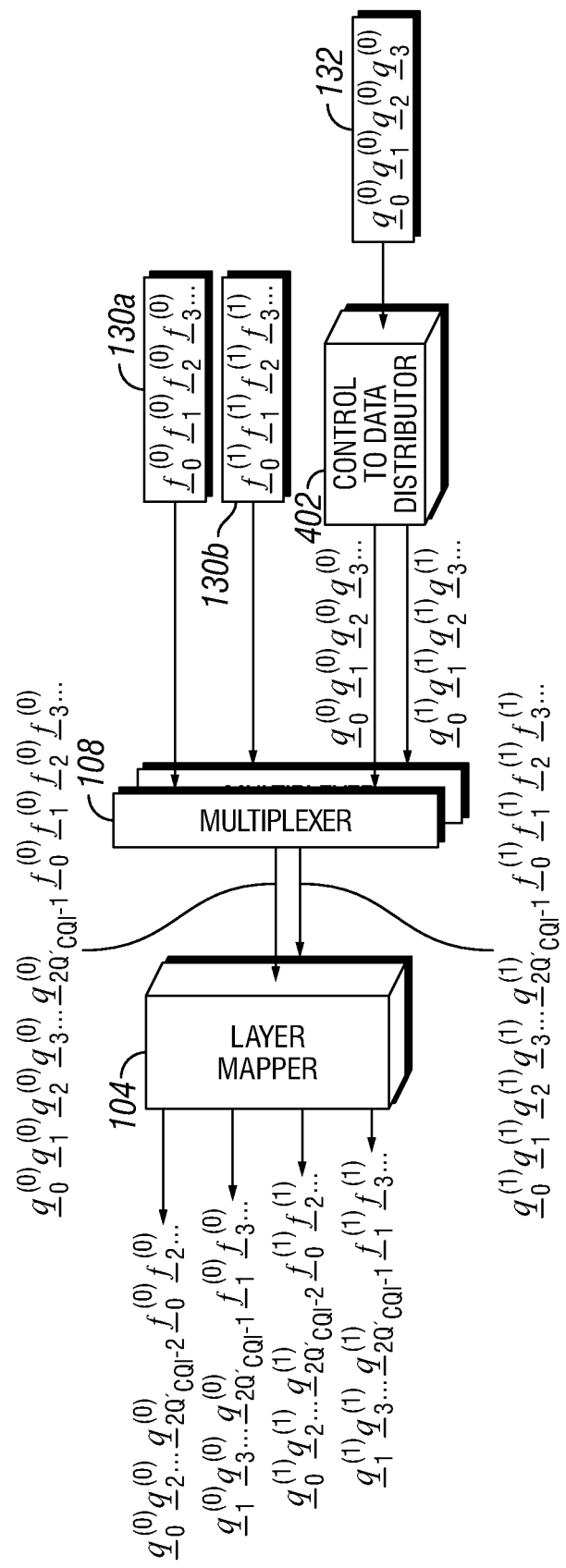

Alternative embodiments of transmitter 100 may produce identical output using other configurations of the codeword-to-layer mapper 104 and the multiplexer 108. For example, FIG. 5A shows another embodiment of the same portion of transmitter 100 in which the codeword-to-layer mapper 104 is moved behind the multiplexer 108 in the relevant datapath 102. Despite this modification, the combination of components can be configured to produce the same output as the embodiment illustrated by FIG. 4A, as shown by the operating example of FIG. 5B. Similarly, FIG. 5C illustrates another configuration of the same portion of transmitter 100. As with FIG. 4C, FIG. 5C illustrates a specific example of FIG. 5A in which control-to-data distributor 402 maps CQI codeword 132 onto only one of the two user data codewords 130 to be transmitted. Thus, as FIGS. 4A-4C and FIGS. 5A-5C show, transmitter 100 can be configured to operate in the same manner regardless of whether layer mapping occurs before or after the user data and control multiplexing performed by multiplexer 108.

Additionally, as a variation on the per-layer embodiment of transmitter 100 that is illustrated by FIG. 1, particular embodiments of transmitter 100 may be capable of performing "per-codeword" processing of input user data codewords 130 under which a separate datapath 602 is associated with each user data codeword 130 to be transmitted as opposed to each transmission layer to be used.

Figure 6:
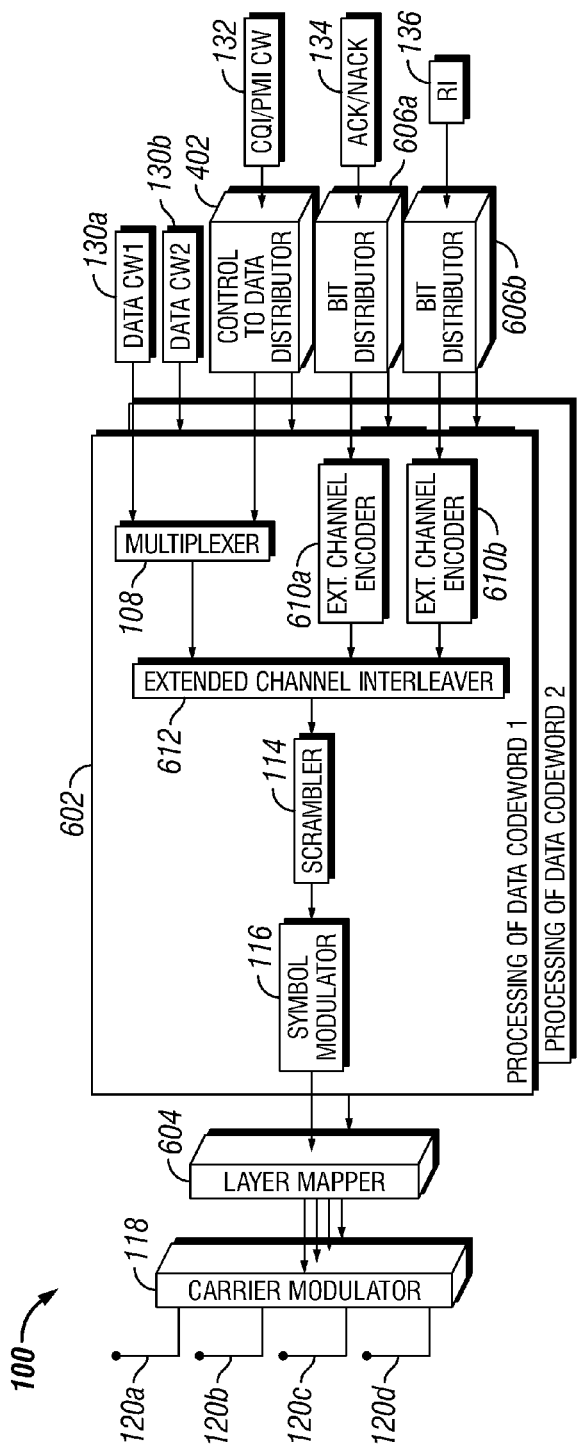
FIG. 6 is a functional block diagram illustrating an alternative embodiment of the transmitter.

FIG. 6 illustrates an alternative embodiment of transmitter 100 in which the allocation techniques described above are implemented by modifying conventional interleaving and channel encoding methods. FIG. 6 shows such an embodiment of transmitter 100. Specifically, the embodiment illustrated by FIG. 6 includes an extended channel interleaver 612 and an extended channel encoder 610 that perform modified versions of the interleaving and channel coding performed by, for example, LTE Release 8 user equipment when transmitting multiplexed user data and control information on the PUSCH.

In particular embodiments, extended channel encoder 610 performs conventional channel coding to unencoded bits of a first type(s) of control information. For the example of FIG. 6, these types of control information again include RI information and HARQ feedback information. In addition to this channel encoding, extended channel encoder 610 may also perform additional operations to facilitate the use of the allocation techniques described above. In particular embodiments, this may involve replicating encoded bits of the control information to match the number of copies of each encoded bit to the number of layers that will be to transmit the relevant codeword.

Figure 7:
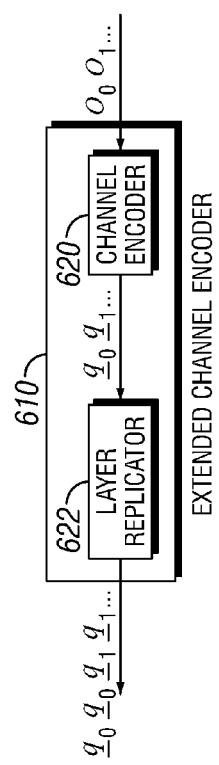
FIG. 7 is a functional block diagram providing further details on a channel encoder utilized by the embodiment shown in FIG. 6.

For example, FIG. 7 illustrates in greater detail a particular embodiment of extended channel encoder 610. As shown by FIG. 7, the illustrated embodiment of extended channel encoder 610 includes a channel encoder 620 which may operate similarly or identically to channel encoder 110 of FIG. 1. Additionally, the illustrated embodiment of extended channel encoder 610 includes a layer replicator 622. Layer replicator 622 receives an input sequence of encoded control information bits and repeats each bit of the sequence once for every layer on which the codeword associated with the relevant datapath will be transmitted. Thus, as shown in FIG. 7, for an example input bit sequence of $o_0 o_1$, channel encoder 620 encodes the input bits to generate an encoded bit sequence, $q_0 q_1$. Depending on the number of layers that will be used to transmit the user data codeword 130 associated with the relevant layer replicator 622, layer replicator 622 may replicate individual bits of the encoded sequence so that the resulting replicated bit sequence includes multiple copies of each bit in the encoded sequence. Specifically, the replicated bit sequence includes a number of copies of each encoded bit equal to the number of layers that will be used to transmit the user data control word 130 associated with this datapath 102. The example extended channel encoder 610 shown in FIG. 7 is assumed to be associated with a user data codeword 130 that will be transmitted on two transmission layers. Thus, layer replicator 622 replicates each bit of the encoded bit sequence ($q_0 q_1$) once so that the replicated bit sequence includes two copies of each encoded bit ($q_0 q_0 q_1 q_1$).

Returning to FIG. 6, the illustrated embodiment of transmitter 100 combines the modified channel coding provided by extended channel encoder 610 with a modified interleaving technique provided by extended channel interleaver 612. As with extended channel encoder 610, extended channel interleaver 612 performs a version of a conventional interleaving technique (e.g., the interleaving specified by LTE Release 8) that has been modified to implement the allocation techniques described above with respect to FIG. 1. More specifically, a conventional interleaver implementing the interleaving specified by LTE Release 8 utilizes a matrix of coded symbols (groups of $Q_m$ bits, where $Q_m$ is the number of bits forming a modulation symbol). Each column in this matrix corresponds to a DFTS-OFDM symbol. Under LTE Release 8 interleaving, the coded symbols (groups of $Q_m$ bits) of the RI codeword are inserted in the assigned positions (as indicated in the example resource grid of FIG. 4). Next, the concatenated CQI/user data codewords (resulting from the multiplexing of CQI codewords 132 and user data codewords 130) are inserted around the RI codeword in a row-first order. Then, coded symbols of ACK/NAK codeword (groups of $Q_m$ bits) are inserted in the assigned positions shown in FIG. 4, puncturing the user data and potentially the CQI information.

In particular embodiments, the Release 8 interleaving scheme is modified for use by extended channel interleaver 612 such that each column in the interleaver matrix represents the DFTS-OFDM symbols that are to be transmitted in parallel on the layers associated with the corresponding user data codeword 130. Moreover, the particular interleaving pattern implemented by extended channel interleaver 612 under this extended interleaving scheme depends on the number of layers a particular control or user data codeword is mapped onto. If a codeword is mapped to L layers, then every Lth coded symbol (group of $Q_m$ bits) in a column is associated with the same layer. That is, the coded symbols of the different layers are interlaced. Additionally, the interleaver matrix is filled in groups of $L \cdot Q_m$ coded bits (contrary to the conventional interleaver that is filled in groups of $Q_m$ bits). The grouping of $L \cdot Q_m$ coded bits ensures time-alignment between the layers associated with a particular codeword, in a similar or identical fashion to that described above with respect to the embodiment of FIG. 1.

When the interleaving of extended channel interleaver 612 is combined with the replication of coded symbols of a first type or types of control information (HARQ and RI information in this example) that is performed by extended channel encoder 610, the coded symbols of the first type(s) of control information will be repeated on all layers of the resulting vector symbols 140 carrying the first type of control information. Thus, the first type(e) of control information will be isolated on separate vector symbols 140 from the user data, with the relevant control information being transmitted on vector symbols 140 that do not carry any user data.

Consequently, with the extensions to the conventional interleaving and channel encoding operations described above, the per-codeword processing embodiment of transmitter 100 shown in FIG. 7 is capable of implementing the same allocation techniques described above with respect to the pre-layer embodiment shown in FIG. 1. Moreover, if the scrambling operations of the per-layer and the per-codeword embodiment are selected appropriately the output of the two embodiments may be identical on a bit-by-bit level. For example, if two sequences are used for the per-codeword processing (one for each codeword), then the per-layer processing formulation can be implemented with the scrambling sequences split onto the two associated layers such that every other group of $Q_m$ bits mapped to every other associated layer. Conversely, if four separate sequences are used for the per-layer processing, the two associated with a single codeword can be interlaced in groups of $Q_m$ bits to form a per-codeword scrambling sequence. For each of these cases, the output of the per-layer embodiment and the per-codeword embodiment (with extended interleaver and channel coders) will be identical.

Figure 3:
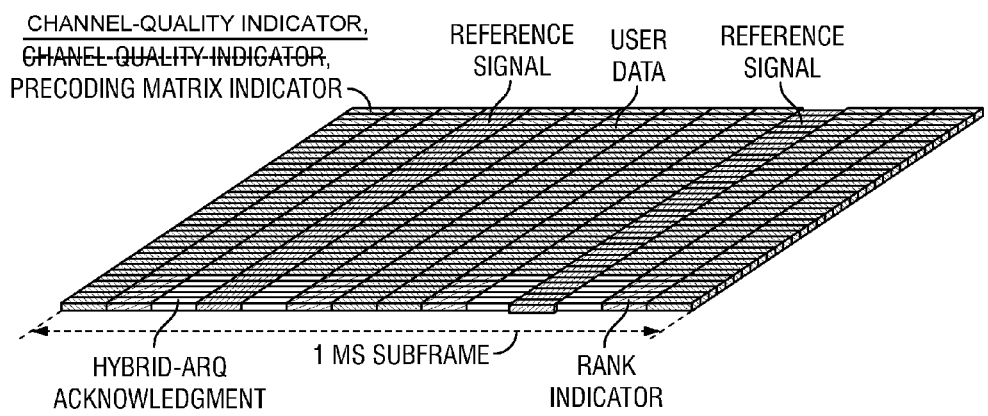
FIG. 3 is a transmission resource grid for an example subframe in a wireless communication system.
Figure 8A:
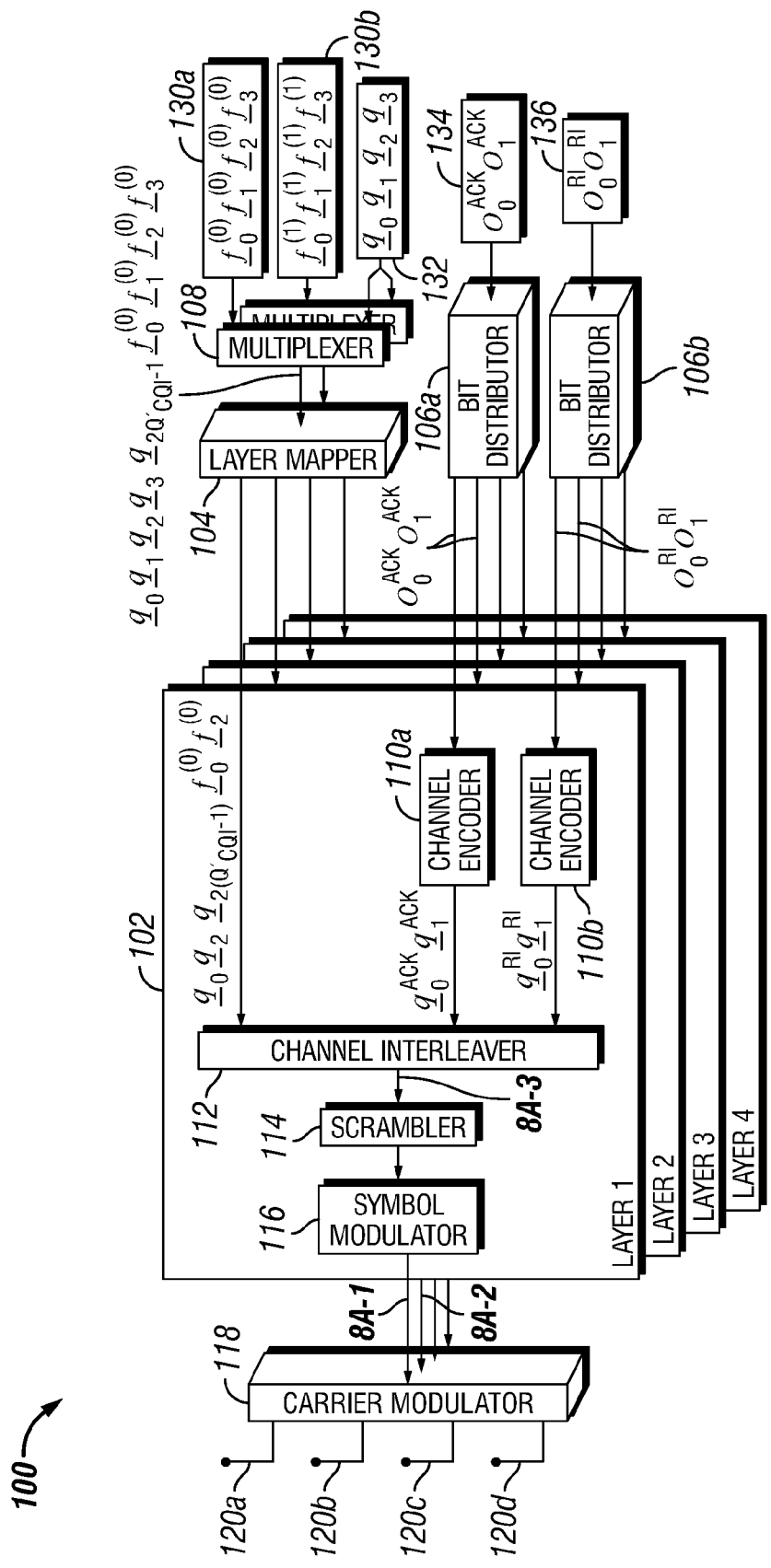
FIGS. 8A and 8B illustrate operation of various embodiments of the transmitter in transmitting example control information and user data.
Figure 8B:
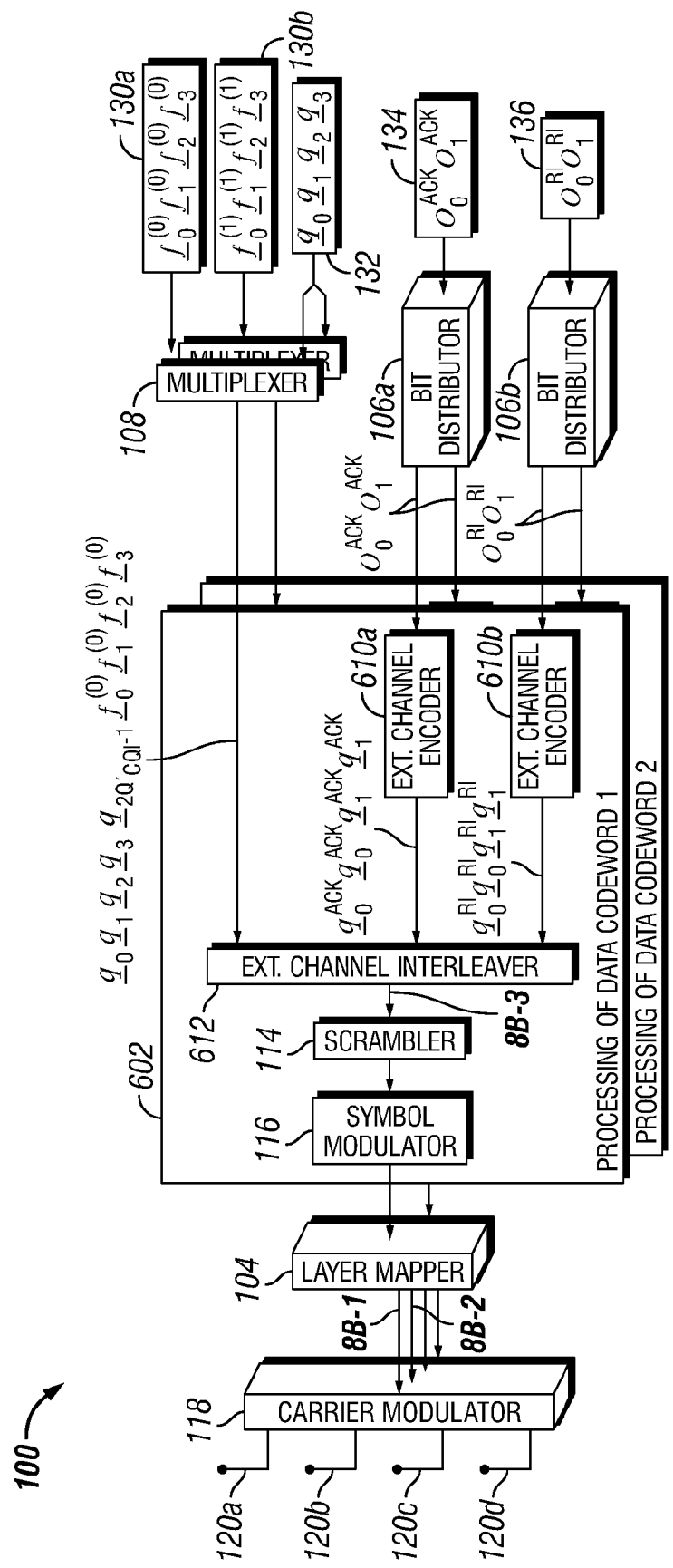

FIGS. 8A and 8B provide an example demonstrating this point. FIG. 8A illustrates PUSCH signaling and UCI multiplexing for a per-layer processing embodiment of transmitter 100 similar to that shown in FIG. 1. In particular, FIG. 8A depicts an embodiment of transmitter 100 that incorporates the CQI/PMI and user data layer-mapping and multiplexing configuration shown in FIG. 5C, but the exact same results can be achieved with the configuration shown in FIG. 4C. For each part of the processing the output on the branches are illustrated via matrix 800*a-c* where each column corresponds to a DFTS-OFDM symbol. In particular, matrix 800*a* illustrates the mapping of control information and user data on a first layer of the resulting vector symbols 140, and matrix 800*b* illustrates the same for a second layer. Matrix 800*c* illustrates the output of channel interleaver 112 for the first layer. FIG. 8A-1 illustrates a matrix 800*a* showing a mapping of control information and user data on a first layer of the resulting vector symbols. FIG. 8A-2 illustrates a matrix 800*b* showing the mapping of control information and user data on a second layer of the resulting vector symbols. FIG. 8A-3 illustrates the channel interleaver 112 output 800*c* for the first layer.

FIG. 8B illustrates PUSCH signaling and UCI multiplexing for a per-codeword processing embodiment similar to that of FIG. 7. As with FIG. 8A, matrices 810*a-c* are used to illustrate the output of particular branches where each column corresponds to a DFTS-OFDM symbol (or to interlaced DFTS-OFDM symbols as output by extended channel interleaver 612). In particular, matrix 810*a* illustrates the mapping of control information and user data on a first layer of the resulting vector symbols 140, and matrix 810*b* illustrates the same for a second layer. Matrix 810*c* illustrates the output of extended channel interleaver 612. FIG. 8B-1 illustrates a matrix 810*a* showing the mapping of control information and user data on a first layer of the resulting vector symbols. FIG. 8B-2 illustrates a matrix 810*b* showing the mapping of control information and user data on a second layer of the resulting vector symbols. FIG. 8B-3 illustrates the extended channel interleaver 612 output 810*c*.

In general, FIGS. 8A and 8B illustrate the processing of encoded user data, CQI, RI, and HARQ-ACK symbols are illustrated for a per-layer and a per-codeword processing embodiment, respectively. In the figures a four-layer transmission is shown, and the CQI codeword is multiplexed with the first user data codeword. As can be seen from the final output of each layer, the resulting resource mapping is the same in both figures. The same conclusion follows analogously for other transmission ranks and CQI-to-data codeword mappings.

FIG. 9 is a structural block diagram showing in greater detail the contents of a particular embodiment of transmitter 100. Transmitter 100 may represent any suitable device capable of implementing the described resource allocation techniques in wireless communication. For example, in particular embodiments, transmitter 100 represents a wireless terminal, such as an LTE user equipment (UE). As shown in FIG. 9, the illustrated embodiment of transmitter 100 includes a processor 910, a memory 920, a transceiver 930, and a plurality of antennas 120.

Processor 910 may represent or include any form of processing component, including dedicated microprocessors, general-purpose computers, or other devices capable of processing electronic information. Examples of processor 910 include field-programmable gate arrays (FPGAs), programmable microprocessors, digital signal processors (DSPs), application-specific integrated circuits (ASICs), and any other suitable specific- or general-purpose processors. Although FIG. 9 illustrates, for the sake of simplicity, an embodiment of transmitter 100 that includes a single processor 910, transmitter 100 may include any number of processors 910 configured to interoperate in any appropriate manner. In particular embodiments, some or all of the functionality described above with respect to FIGS. 1-2 and 4-8B may be implemented by processor 910 executing instructions and/or operating in accordance with its hard-wired logic. Similarly, in particular embodiments, some or all of the functional blocks described above with respect to FIGS. 1-2 and 4-8B may represent processor 910 executing software.

Memory 920 stores processor instructions, equation parameters, resource allocations, and/or any other data utilized by transmitter 920 during operation. Memory 920 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 9, memory 920 may include one or more physical components local to or remote from transmitter 100.

Transceiver 930 transmits and receives RF signals over antennas 340*a-d*. Transceiver 100 may represent any suitable form of RF transceiver. Although the example embodiment in FIG. 9 includes a certain number of antennas 340, alternative embodiments of transmitter 100 may include any appropriate number of antennas 340. Additionally, in particular embodiments, transceiver 930 may represent, in whole or in part, a portion of processor 910.

Figure 10:
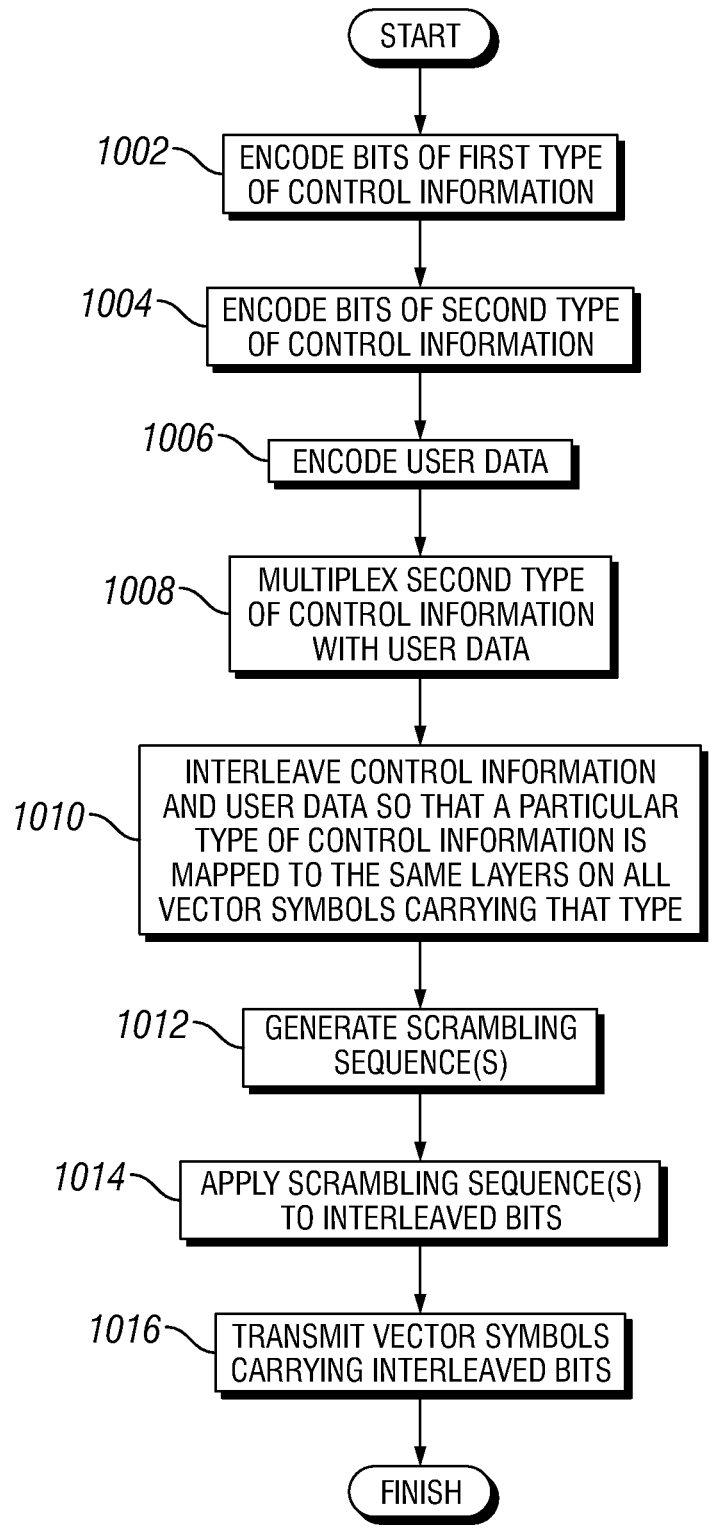
FIG. 10 is a flowchart illustrating example operation of a particular embodiment of the transmitter.

FIG. 10 is a flowchart illustrating example operation of a particular embodiment of transmitter 100 in allocating user data and control information to transmission resources. In particular, FIG. 10 illustrates example operation for a particular embodiment of transmitter 100 that transmits certain types of control information (in this case, ACK/NAK and RI information) in vector symbols 140 that contain only control information, while transmitting other types (in this case, CQI/PMI information) in vector symbols 140 that include both control information and user data. The steps illustrated in FIG. 10 may be combined, modified, or deleted where appropriate. Additional steps may also be added to the example operation. Furthermore, the described steps may be performed in any suitable order.

Operation begins in the illustrated example with transmitter 100 encoding the various types of information to be transmitted during a particular subframe. Thus, at step 1002, transmitter 100 encodes bits of a first type of control information to form one or more control codewords. At step 1004, transmitter 100 encodes bits of a second type of control information to form one or more control codewords. Transmitter 100 also encodes bits of user data, at step 1006, to form one or more user data codewords. Depending on the types of information to be transmitted and the performance requirements of the communication system, transmitter 100 may use a common encoding scheme or multiple different encoding schemes to encode the information. In particular embodiments, transmitter 100 may replicate bits of the first type of control information (before or after encoding) to ensure that, in any vector symbol 140 carrying the first type of control information, the first type of control information is mapped to all transmission layers used for the transmission. Additionally, in particular embodiments, transmitter 100 may encode bits of the second type of control information at a rate to form a first codeword such that a number of bits in the first codeword is equal to $$Q' \times \sum_{l=1}^{r} Q_{m,l},$$

where Q' is an integer and $Q_{m,l}$ is a number of bits of each modulation symbol on layer l and r is a total number of layers over which a user data codeword to be multiplexed with the second type of control information will be transmitted. This may ensure that the second type of control information is mapped to the same transmission layers in all vector symbols 140 that carry the second type of control information, even if other transmission layers are used to transmit user data.

After all of the information to be transmitted during the relevant subframe has been encoded, transmitter 100 combines the control information to be transmitted with the user data. In particular embodiments, transmitter 100 may combine various types of control information with user data in different ways. For example, in the illustrated embodiment, at step 1008, transmitter 100 multiplexes certain types of control information (i.e., encoded CQI information) with user data codewords prior to allocating control information and user data to transmission resources. Transmitter 100 may distribute this control information to one or more user data codewords so that encoded bits of the control information are concatenated with the relevant user data codeword(s). For example, in particular embodiments, transmitter 100 segments each control codeword of the second type into a number of parts that is equal to the total number of layers (r) over which the relevant user data codeword(s) to be multiplexed will be transmitted. Transmitter 100 may perform this segmenting in such a manner that, when transmitter 100 subsequently allocates the various types of control information and user data to transmission resources, the part of segmented control codeword that is assigned to a particular layer (l) will have a length equal to $(Q' \times Q_{m,l})$ bits. Alternatively, transmitter 100 may distribute the second type of control codeword such that:

$$CW_l^{CQI/PMI}(k) = CW^{CQI/PMI}\left(\left\lfloor \frac{k}{Q_{m,l}} \right\rfloor \cdot \sum_{\tilde{l}=1}^{r} Q_{m,\tilde{l}} + \sum_{\tilde{l}=1}^{l-1} Q_{m,\tilde{l}} + k\right)$$

where $CW_l^{CQI/PMI}(k)$ denotes the k-th bit (starting counting from 0) of the control codeword mapped to layer l (starting counting from 1) and $CW^{CQI/PMI}(m)$ denotes the m th bit (starting counting from 0) of the codeword prior to layer mapping.

Transmitter 100 then generates a plurality of vector symbols 140 based on the control codewords and the user data codewords. Each vector symbol 140 comprises a plurality of modulation symbols that are each associated with a transmission layer over which the associated modulation symbol will be transmitted. As part of generating these vector symbols 140, transmitter 100 interleaves bits of the first type of control information with bits of one or more user data control codewords, including any bits of the second type of control information that have been concatenated with user data codewords at step 1010. In particular embodiments, transmitter 100 interleaves the control information and user data such that control information of a particular type is mapped to the same layers in all vector symbols 140 transmitted during the relevant subframe that carry the relevant type of control information. Additionally, in particular embodiments, transmitter 100 interleaves the control information and user data in a manner such that control information of certain types (e.g., ACK/NACK information and RI information) is mapped to separate vector symbols 140 from user data. Furthermore, in particular embodiments, transmitter 100 interleaves the control information and user data in a manner such that other types of control information are mapped to vector symbols 140 to which user data is also mapped. However, in particular embodiments, these other types of control information are still mapped to the same set of transmission layers in all vector symbols 140 transmitted during the subframe that carry the relevant type(s) of control information.

After interleaving the bits of control information and user data, transmitter 100 may scramble the interleaved bits. Thus, in the illustrated example, transmitter 100 generates a scrambling sequence or sequences, at step 1012, and applies the scrambling sequence to groups of the interleaved bits, at step 1014. In particular embodiments, transmitter generates a scrambling sequence for each layer particular based on a sequence seed ($c_{init}$) associated with that layer. For example, transmitter 100 may generate a scrambling sequence based on a sequence seed $c_{init} = n_{RNTI} \cdot 2^{15} + q \cdot 2^{13} + \lfloor n_s/2 \rfloor \cdot 2^9 + N_{ID}^{cell}$, where q is the layer associated with the sequence seed, $n_{RNTI}$ is a terminal radio network temporary id, $n_s$, is a slot number within a radio frame, and $N_{ID}^{cell}$ is a cell identifier associated with a cell in which the vector symbols 140 are to be transmitted. After generating the scrambling sequence(s), in such embodiments, transmitter 100 scrambles each group of interleaved bits by its corresponding scrambling sequence, as shown at step 1014.

Once transmitter 100 has generated vector symbols 140 and performed any suitable processing, transmitter 100 transmits the generated vector symbols 140 at step 1016. As explained above, in particular embodiments, each type of control information is mapped to the same layers in all of the vector symbols 140 that carry that type of control information. Additionally, certain types of control information (e.g., ACK/NAK information and RI information here) are mapped to separate vector symbols 140 so that no vector symbols carrying these types of control information also carry user data. However, other types of control information (e.g., CQI information here) may be mapped to vector symbols 140 that also carry user data. Operation of transmitter 100 with respect to transmitting the relevant control information and user data may then end as shown in FIG. 10.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for wirelessly transmitting user data and at least a first type of control information using a plurality of transmission layers, comprising:
    encoding bits of a first type of control information to form one or more control codewords of the first type of control information;
    encoding bits of a second type of control information to form one or more control codewords of the second type of control information;
    encoding bits of user data to form one or more user data codewords;
    generating a plurality of vector symbols based on the control codewords of the first type of control information, control codewords of the second type of control information and the user data codewords, each vector symbol comprising a plurality of modulation symbols that are each associated with a transmission layer over which the associated modulation symbol will be transmitted, wherein generating the plurality of vector symbols comprises interleaving bits of the one or more control codewords of the first type of control information, bits of the one or more control codewords of the second type of control information, and bits of the one or more user data codewords so that:
    the first type of control information is carried in modulation symbols associated with the same transmission layers in all the vector symbols transmitted during the subframe that carry the first type of control information;
    none of the generated vector symbols that carry control information of the first type also carry user data; and
    at least one of the generated vector symbols that carries control information of the second type also carries user data; and
    transmitting the plurality of vector symbols to a receiver over a plurality of transmission layers.

2. The method of claim 1, wherein encoding bits of the second type of control information comprises encoding bits of control information at a rate to form a first codeword such that a number of bits in the first codeword is equal to:

$$Q' \times \sum_{l=1}^{r} Q_{m,l},$$

wherein Q' is an integer and Qm,l is a number of bits of each modulation symbol on layer l and r is a total number of layers over which a user data codeword to be multiplexed with the second type of control information will be transmitted.

3. The method of claim 1, wherein generating the plurality of vector symbols comprises segmenting at least one control codeword of the second type of control information into a number of parts that is equal to the total number of layers r over which the user data codeword to be multiplexed will be transmitted, and wherein a part assigned to a particular layer l has a length equal to Q'3Qm,l bits, wherein Q' is an integer and Qm,l is a number of bits of each modulation symbol on layer l.

4. The method of claim 1, wherein the second type of control information comprises at least one of a channel quality indication CQI and a precoder matrix indication PMI.

5. The method of claim 1, wherein generating the plurality of vector symbols comprises mapping bits of at least one control codeword of the second type of control information to a vector symbol in a manner such that:
    wherein CW(m) is an m-th bit of the mapped control codeword with m starting from zero, and wherein CWl(k) is a k-th bit of a group of bits associated with a layer l in the corresponding vector symbol with k starting at zero and l starting at one.

6. The method of claim 1, wherein generating the plurality of vector symbols comprises mapping bits of at least one control codeword to a vector symbol in a manner such that for each pair of neighboring bits in the control codeword a first bit of the pair is mapped to at least a first layer of a corresponding vector symbol and a second bit of the pair is mapped to at least a second layer of the corresponding vector symbol different from the first layer.

7. The method of claim 1, wherein generating the plurality of vector symbols comprises:
    segmenting at least one codeword into at least two segments; and
    mapping bits of a first segment of the control word to at least a first layer of a corresponding vector symbol; and
    mapping bits of a second segment of the control word to at least a second layer of the corresponding vector symbol different from the first layer.

8. The method of claim 1, wherein generating the plurality of vector symbols comprises generating at least one vector symbol by:
    replicating one or more bits of control information for transmission to a plurality of encoders;
    encoding the replicated control information in parallel at the plurality of encoders; and
    mapping the encoded control information onto every layer of the vector symbol.

9. The method of claim 1, wherein the first type of control codewords comprises codewords carrying Hybrid Automatic Repeat ReQuest, HARQ, bits.

10. The method of claim 1, wherein the first type of control codewords comprises codewords carrying Rank Indication, RI, bits.

11. The method of claim 1, wherein generating the plurality of vector symbols comprises:

generating a scrambling sequence for each transmission layer based on a sequence seed cinit associated with that layer; and scrambling each modulation symbol in the vector symbols by a scrambling sequence corresponding to a transmission layer associated with that modulation symbol, wherein:

$$c_{init} = n_{RNTI} \cdot 2^{15} + q \cdot 2^{13} + \lfloor n_s/2 \rfloor \cdot 2^9 + N_{ID}^{cell},$$

and wherein q is the layer associated with the sequence seed, nRNTI· is a radio network temporary id, ns is a slot number within a radio frame, and $N_{ID}^{cell}$ is a cell identifier associated with a cell in which the vector symbols are to be transmitted.

12. The method of claim 1, wherein interleaving bits of the one or more control codewords and bits of the one or more user data codewords comprises:

multiplexing a first control codeword and a first user data codeword before interleaving the bits of the one or more control codewords and the bits of the one or more user data codewords; and interleaving bits of the multiplexed first control codeword and first user data codeword with bits of a second control codeword.

13. An apparatus for wirelessly transmitting user data and control information using a plurality of transmission layers, the apparatus comprising:

a plurality of antennas;

a transceiver operable to transmit vector symbols over a plurality of transmission layers using the plurality of antennas; and a processor operable to:

encode bits of a first type of control information to form one or more control codewords of the first type of control information;

encode bits of a second type of control information to form one or more codewords of the second type of control information encode bits of user data to form one or more user data codewords;

generate a plurality of vector symbols based on the control codewords of the first type of control information, control codewords of the second type of control information and the user data codewords, each vector symbol comprising a plurality of modulation symbols that are each associated with a transmission layer over which the associated modulation symbol will be transmitted, wherein generating the plurality of vector symbols comprises interleaving bits of the one or more control codewords of the first type of control information, bits of the one or more control codewords of the second type of control information, and bits of the one or more user data codewords so that:

the first type of control information is carried in modulation symbols associated with the same transmission layers in all the vector symbols transmitted during the subframe that carry the first type of control information;

none of the generated vector symbols that carry control information of the first type also carry user data; and at least one of the generated vector symbols that carries control information of the second type also carries user data; and transmit the plurality of vector symbols to a receiver over a plurality of transmission layers using the transceiver.

14. The apparatus of claim 13, wherein the second type of control information comprises at least one of a channel quality indication, CQI, and a precoder matrix indication, PMI.

15. The apparatus of claim 13, wherein the first type of control codewords comprises codewords carrying Hybrid Automatic Repeat ReQuest, HARQ, bits or codewords carrying Rank Indication, RI, bits.

* * * * *

UNITED STATES PATENT AND TRADEMARK OFFICE
CERTIFICATE OF CORRECTION

PATENT NO. : 9,480,056 B2
APPLICATION NO. : 14/957759
DATED : October 25, 2016
INVENTOR(S) : Hammarwall et al.

It is certified that error appears in the above-identified patent and that said Letters Patent is hereby corrected as shown below:

In Fig. 1, Sheet 1 of 13, for Tag "110a", Line 2, delete "CODER" and insert -- ENCODER --, therefor.

In Fig. 1, Sheet 1 of 13, for Tag "110b", Line 2, delete "CODER" and insert -- ENCODER --, therefor.

In Fig. 3, Sheet 2 of 13, delete " " and insert -- CHANNEL-QUALITY INDICATOR, --, therefor.

In Column 1, Line 4, delete "119(e)" and insert -- § 119(e) --, therefor.

In Column 1, Line 7, delete "2014," and insert -- 2014, now Pat. No. 9,237,565, --, therefor.

In Column 1, Line 9, delete "2011," and insert -- 2011, now Pat. No. 8,705,574, --, therefor.

In Column 2, Line 62, delete "symbols." and insert -- symbols; --, therefor.

In Column 2, Line 65, delete "symbols." and insert -- symbols; --, therefor.

In Column 2, Line 67, delete "channel." and insert -- channel; --, therefor.

In Column 3, Line 3, delete "symbols." and insert -- symbols; --, therefor.

In Column 3, Line 6, delete "symbols." and insert -- symbols; --, therefor.

In Column 3, Line 8, delete "output." and insert -- output; --, therefor.

In Column 3, Line 54, delete "transform," and insert -- transform --, therefor.

In Column 13, Line 13, delete "type(e)" and insert -- type(s) --, therefor.

Signed and Sealed this
Twenty-eighth Day of February, 2017

Michelle K. Lee
*Director of the United States Patent and Trademark Office*

CERTIFICATE OF CORRECTION (continued)
U.S. Pat. No. 9,480,056 B2

In Column 14, Line 53, delete "transmitter 920" and insert -- transmitter 100 --, therefor.

In Column 14, Line 63, delete "Transceiver 100" and insert -- Transceiver 930 --, therefor.

In Column 16, Line 64, delete "$n_{RNTI}.$" and insert -- $n_{RNTI}$ --, therefor.

In Column 18, Line 23, in Claim 4, delete "indication CQI and a precoder matrix indication" and insert -- indication, CQI, and a precoder matrix indication, --, therefor.

In Column 19, Line 11, in Claim 11, delete "nRNTI." and insert -- $n_{RNTI}$ --, therefor.